(12) United States Patent
Vauchel et al.

(10) Patent No.: US 9,212,689 B2
(45) Date of Patent: Dec. 15, 2015

(54) BENT CONNECTING ROD FITTED WITH AT LEAST ONE SELF-ALIGNING MEANS

(75) Inventors: Guy Bernard Vauchel, Harfleur (FR); Peter Segat, Le Havre (FR); Andre Baillard, Bretteville Du Grand Caux (FR); Georges Alain Bouret, Epouville (FR)

(73) Assignee: AIRCELLE, Gonfreville l'Orcher (FR)

( * ) Notice: Subject to any disclaimer, the term of this patent is extended or adjusted under 35 U.S.C. 154(b) by 1008 days.

(21) Appl. No.: 13/257,381

(22) PCT Filed: Mar. 9, 2010

(86) PCT No.: PCT/FR2010/050398
§ 371 (c)(1),
(2), (4) Date: Sep. 19, 2011

(87) PCT Pub. No.: WO2010/109109
PCT Pub. Date: Sep. 30, 2010

(65) Prior Publication Data
US 2012/0006000 A1    Jan. 12, 2012

(30) Foreign Application Priority Data
Mar. 27, 2009    (FR) ..................................... 09 01496

(51) Int. Cl.
*F16C 7/04*    (2006.01)
*F02K 1/12*    (2006.01)
(Continued)

(52) U.S. Cl.
CPC .................. *F16C 7/04* (2013.01); *F02K 1/1261* (2013.01); *F02K 1/70* (2013.01); *F02K 1/72* (2013.01); *F16C 7/06* (2013.01); *Y10T 74/2142* (2015.01)

(58) Field of Classification Search
CPC ........... F02K 1/12; F02K 1/1261; F02K 1/70; F02K 1/72; F16C 7/04; F16C 7/06; F05D 2250/38; F05D 2250/75
USPC .................... 60/226.2, 230, 233; 239/265.19, 239/265.37, 265.39; 74/579 R; 244/110 B
See application file for complete search history.

(56) References Cited

U.S. PATENT DOCUMENTS 3,829,020 A * 8/1974 Stearns .................... 239/265.13
4,533,098 A   8/1985 Bonini et al.
(Continued)

FOREIGN PATENT DOCUMENTS

FR    2379705    2/1977
FR    2934327 A1    1/2010
(Continued)

OTHER PUBLICATIONS

International Search Report PCT/FR2010/050398; Jul. 13, 2011.

*Primary Examiner* — J. Gregory Pickett
(74) *Attorney, Agent, or Firm* — Brinks Gilson & Lione (57) ABSTRACT

The invention relates to a bent connecting rod (31) for linking a first assembly to a second assembly which are movable relative to each other and through which a flow in the space defined thereby passes. The rod has at least one first and one second pivot point (35, 38) that are designed so as to enable the pivotal movement of the connecting rod (31) relative to said first and second assemblies, respectively, the bent connecting rod (31) being suitably positionable such that the bend (40) is located upstream from said flow relative to said second pivot point (38), said second pivot point (38) being suitably built into the second movable assembly, characterized in that the bent connecting rod (31) includes at least two portions (33, 37) linked together by at least one self-aligning means (39a, 39b).

9 Claims, 6 Drawing Sheets

(51) Int. Cl.
  *F02K 1/70* (2006.01)
  *F02K 1/72* (2006.01)
  *F16C 7/06* (2006.01)

(56) References Cited

U.S. PATENT DOCUMENTS

| | | | | |
|---|---|---|---|---|
| 4,976,466 | A | * | 12/1990 | Vauchel ........................ 60/226.2 |
| 5,003,770 | A | * | 4/1991 | Schegerin et al. ............ 60/226.2 |
| 5,197,694 | A | * | 3/1993 | Nash et al. ................. 244/110 B |
| 6,349,919 | B1 | * | 2/2002 | Zupan et al. ................... 248/674 |
| 7,559,507 | B2 | * | 7/2009 | Harrison et al. ........... 244/110 B |
| 8,109,467 | B2 | * | 2/2012 | Murphy .................... 244/110 B |
| 2007/0007388 | A1 | * | 1/2007 | Harrison et al. ........... 244/110 B |

FOREIGN PATENT DOCUMENTS

| | | |
|---|---|---|
| FR | 2939477 A1 | 11/2010 |
| GB | 1421153 | 1/1976 |

\* cited by examiner

BENT CONNECTING ROD FITTED WITH AT LEAST ONE SELF-ALIGNING MEANS

TECHNICAL FIELD

The present invention relates to a bent connecting rod intended to connect a first assembly to a second assembly which are moveable relatively to each other, equipped with at least one self-aligning means.

BACKGROUND

These are notably assemblies used in the aeronautical field, and in particular the downstream section of a secondary nozzle of an aircraft nacelle and the fixed internal structure of this nacelle.

An aircraft nacelle generally has a tubular structure comprising an air intake upstream from the turbine engine, a middle section intended to surround a fan of the turbine engine, a downstream section harboring thrust inversion means and intended to surround the combustion chamber of the turbine engine, and is generally terminated by an ejection nozzle, the outlet of which is located downstream from the turbine engine.

Modern nacelles are intended to harbor a ducted-fan turbine engine capable of generating via the blades of the rotating fan a hot air flow (also called a primary flow) stemming from the combustion chamber of the turbine engine, and a cold air flow (secondary flow) which circulates outside the turbine engine through an annular passage, also called a vein, formed between a fairing of the turbine engine, often designated as a fixed internal structure and an internal wall of the nacelle. Both air flows are ejected from the turbine engine through the rear of the nacelle.

The rear section of the nacelle has an ejection nozzle intended to channel the ejection of the airflows. This nozzle may come as an addition to a primary nozzle channeling the hot flow and is then called a secondary nozzle.

The role of a thrust inverter is, during the landing of an airplane, to improve the braking capability of the latter by redirecting forwards at least one portion of the thrust generated by the turbine engine. In this phase, the inverter obstructs the cold flow vein and directs the latter towards the front of the nacelle, consequently generating a counter thrust which will be added to the braking of the wheels of the airplane.

The means applied for achieving this reorientation of the cold flow vary according to the inverter type. However, in every case, the structure of an inverter comprises moveable displaceable elements between a deployed position in which they open in the nacelle a passage intended for the deflected flow on the one hand and a retracted position in which they close this passage on the other hand. These moveable elements may fulfil a deflection function or simply for activating other deflection means.

Moreover, in order to transform an overall rectilinear displacement into essentially a rotary movement by transmitting forces transmitted on the moveable element towards other elements, it is currently resorted to a connecting rod system.

For this purpose, it is known from the state of the art how to use straight connecting rods mainly consisting of a metal rod joining two joints with a moveable axis connected to the moveable elements. Such straight connecting rods are notably used in the downstream section of aircraft nacelles, equipped with thrust inverters, and more particularly for causing the inclination of a moveable panel from a substantially rectilinear displacement of the cowl on which it is rotatably attached. French application FR 08/04295 relates to such an arrangement with a straight connecting rod connecting a panel firmly attached to the secondary nozzle to the fixed fairing section of the turbine engine.

Such a straight connecting rod system is not always adapted to these nacelles equipped with thrust inverters. The presence of such connecting rods in the secondary flow considerably perturbs the aerodynamics and reduces the performances of the engine. Also, in order not to perturb the aerodynamics, it is known how to attach the connecting rod further upstream on the fixed internal structure. However, such a positioning upstream from the straight connecting rods is often unsuitable for allowing a displacement of the cowl which sufficiently exposes the deflection means, and by doing this ensuring the sought essentially vertical positioning of the moveable panel at the end of travel.

In order to fulfil aerodynamics on the one hand and therefore the presence of a connecting rod body positioned further upstream, and to keep the pivot point of the connecting rod on the fixed internal structure located further downstream, it is possible to resort to a bent connecting rod as illustrated in U.S. Pat. No. 4,533,098.

However, with such a bent connecting rod, during displacements of the cowl with the panel, the connecting rod is positioned in unstable and uncontrolled conformations which may cause its breaking or weakening of the surrounding structure. Such a phenomenon is amplified by the secondary airflow in the vein which induces strong vibrations of the connecting rod on its pivot points.

In order to stabilize the connecting rod, one of the possibilities is to embed one of the pivot points of the connecting rod. For this purpose, connecting rods with the pivot point of the connecting rod foot embedded into the fixed fairing structure of the turbine engine (or fixed internal structure) are known from application FR 08/06929. However such an arrangement is not very tolerant to changes in alignment of the parts, notably dealing with the alignment of the pivot points with the attachment points into which they are intended to be embedded.

BRIEF SUMMARY

In order to overcome the aforementioned drawbacks, the present invention relates, according to a first aspect, to a bent connecting rod, intended to connect a first assembly to a second assembly which are moveable relatively to each other and crossed by a flow in the space which they delimit, provided with at least one first and one second pivot points, designed so as to allow pivoting of the connecting rod relatively to said first and second assemblies respectively, the bent connecting rod being adapted so as to be positioned so that the bend is upstream from said flow relatively to said second pivot point, said second pivot point being adapted so as to be embedded into the second moveable assembly, characterized in that the bent connecting rod comprises at least two portions connected together through at least one self-aligning means.

With such an arrangement of a connecting rod with several portions, it is possible to reduce the stresses on the paths, notably at the pivot points on the fixed internal structure and on the secondary nozzle, given that impacts and vibrations are absorbed by at least one connecting point made from a self-aligning means.

The term of "self-aligning means" in the sense of the present invention defines an attachment point comprising an element giving some freedom of movement among the parts which it assembles, such as an element including at least one ball joint, designated as a <<ball-jointed element>>, or as an elastic assembly of the <<Paulstra™>> ring type. Thus, the parts connected by these points are moveable relatively to each other. The self-aligning means may for example have an essentially spherical structure, but may also have a mainly elongated configuration in order to maintain certain angles fixed among the parts of the connecting rod, such as to keep the angle of the bend of the connecting rod constant or for blocking the alignment between different portions of members.

According to other optional characteristics of the connecting device according to the present invention:

- the bent connecting rod comprises a first and a second portion connected together through at least one self-aligning means, said first portion being adapted so as to be connected to the first assembly through the first pivot point and said second portion being adapted so as to be connected to the second assembly through the second pivot point: such an assembly for example by means of ball joints directly inserted into the portions most likely to be sensitive to stresses, since they are connected through pivot points to the fixed internal structure and to the secondary nozzle, guarantees flexibility of the bent connecting rod by the absorption of stresses by the self-aligning means;
- preferably, the second portion is embedded into the first portion and is maintained firmly attached to said first portion by two self-aligning means: such an arrangement is easy to achieve and is safe, it is possible to resort to spherical ball jointed elements such as those currently used in the field of aeronautics;
- one of said portions is bent;
- preferably, the adapted portion for being connected to the first assembly through the first pivot point is bent;
- said self-aligning means are positioned between the second pivot point and the bend of the connecting rod;
- the arrangement of said portions two by two is achieved through at least two self-alignment means as far away as possible from each other: such an arrangement gives the possibility of obtaining a maximum lever arm in order to reduce the torsion forces in the structure of the members bearing the self-aligning means;
- the first pivot point crosses the profile of the body of the connecting rod substantially in the middle of the width of said profile: a portion of the structure of the body of the connecting rod is thus positioned in an area with a lower secondary flow velocity, and the impact on the aerodynamic performances of the connecting rod is thereby reduced;
- the connecting rod comprises a shield which extends upstream from the body of the connecting rod with an apron: aerodynamic smoothing of the connecting rod is thereby obtained, notably during the initial phases for displacing a moveable cowl;
- the second pivot point comprises a hub: replacing the ball joint currently used by such a hub, in the pivot point of the connecting rod foot attached to the fixed internal structure, the hub allows improvement in the stability of the connecting rod in all the maneuvering phases, one skilled in the art is aware of the hub width to be selected in order to adapt it to the morphology of the assembly;
- at least one of said self-aligning means comprising any of the elements selected from a ball-jointed element and an elastic assembly such as the rings of the Paulstra™ type.

According to a second aspect, the present invention relates to a ducted-fan turbine engine nacelle comprising a downstream section, equipped with a thrust inversion device comprising a moveable cowl translationally mounted along a direction substantially parallel to a longitudinal axis of the nacelle capable of passing alternately from a closure position in which it ensures aerodynamic continuity of the nacelle and covers deflection means, to an open position in which it opens a passage in the nacelle and exposes the deflection means, said moveable cowl being also extended with at least one nozzle section mounted at one downstream end of said moveable cowl, and comprising at least one panel rotatably mounted around at least one pivot along an axis substantially perpendicular to a longitudinal axis of the nacelle, remarkable in that said panel is connected to a fixed fairing structure of the turbine engine through at least one bent connecting rod as described earlier, rotatably mounted around the first and second pivot points on the nozzle section panel and on the fixed structure respectively.

BRIEF DESCRIPTION OF THE DRAWINGS

Other characteristics and advantages of the present invention will become apparent in the light of the description which follows with reference to the appended figures. FIGS. 1 to 3b relate to connecting rods of the prior art, and FIGS. 4 to 10 illustrate embodiments with connecting rods according to the present invention:

DETAILED DESCRIPTION

The terms of <<upstream>> and <<downstream>> in the present context are defined relatively to the direction of circulation of the cold airflow in the annular passage. The air intake of the turbine engine is located the most upstream from the cold airflow circulating in the annular passage, while the air outlet is located the most downstream from the cold airflow circulating in the annular passage. In the appended drawings which illustrate a nacelle section, the cold airflow circulates from left to right, thus the air intake is located towards the left and the air outlet towards the right of these figures.

Figure 1:
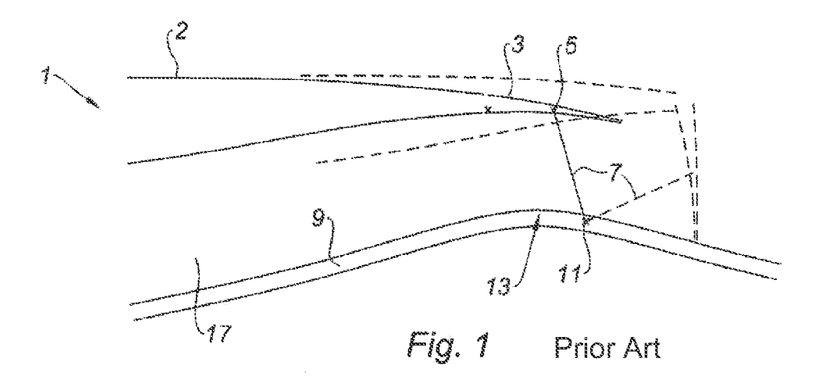
FIG. 1 illustrates a longitudinal sectional detailed view of the upstream section of an aircraft nacelle with a thrust inverter with a straight connecting rod from the state of the art connecting a moveable panel of the secondary nozzle to the fixed structure.

A secondary nozzle 1 with a thrust inverter as illustrated in FIG. 1, has a moveable cowl 2 extended on its downstream portion with a moveable panel 3 which pivots on an axis substantially perpendicular to the longitudinal axis of the nacelle, substantially inscribed in the plane of FIG. 1. A straight connecting rod 7 is mounted on the moveable panel 3 through a first pivot point 5 on the one hand and to an internal fixed structure 9 through a second pivot point 11 on the other hand. The pivot point 11 of the connecting rod foot 7 should be positioned very downstream, preferably downstream from a convex fairing portion 13. In order to allow the moveable cowl 2 to advance sufficiently so as to expose deflection means 15 (grids) by causing inclination of the moveable panel 3 so that it is found at the end of travel as illustrated in dotted lines on the right of FIG. 1.

Figure 2:
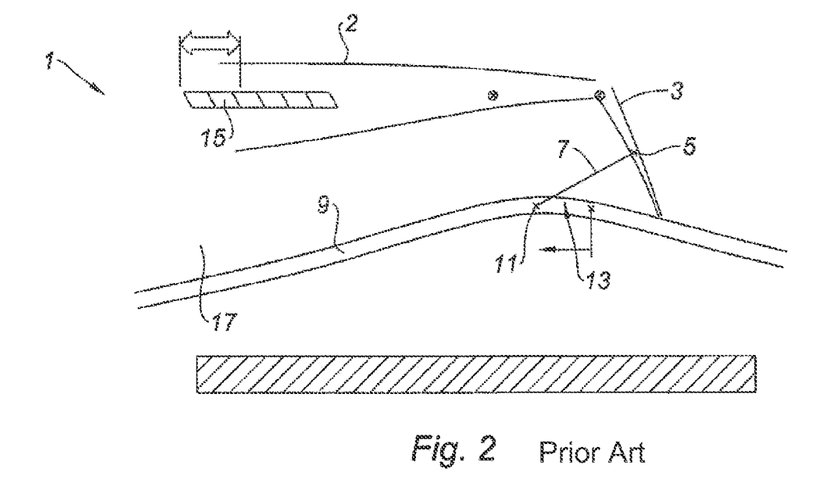
FIG. 2 illustrates a longitudinal sectional detailed view of the downstream section of an aircraft nacelle with a thrust inverter with the same straight connecting rod from the state of the art, but the pivot point of which of the connecting rod foot is further moved forwards upstream.

In order not to penalize the performances of the engine by notably perturbing the aerodynamics of the annular passage 17, the pivot point 11 of the connecting rod foot 7 should be shifted as far as upstream as possible, ideally upstream from the convex fairing portion 13 (see FIG. 2). However, such a configuration does not allow the moveable cowl 2 to sufficiently uncover the deflection means 15 and the panel 3 does not follow the sought path.

Figure 3A:
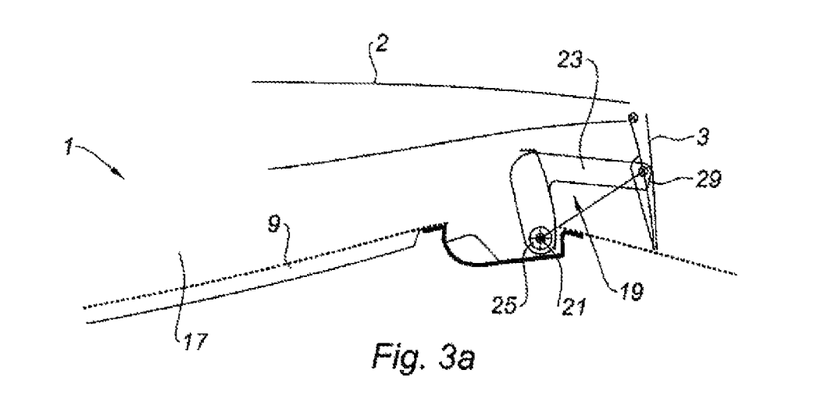
FIG. 3a illustrates a longitudinal sectional detailed view of the downstream section of an aircraft nacelle with a thrust inverter in an open position equipped with a bent connecting rod in one portion.
Figure 3B:
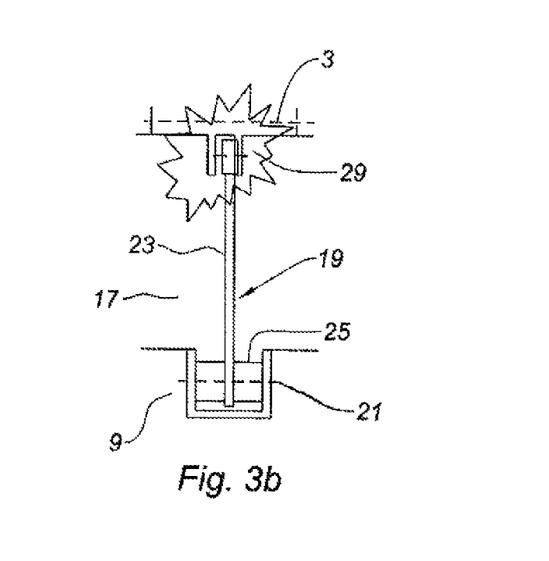
FIG. 3b illustrates a cross-sectional schematic view of a downstream section portion of an aircraft nacelle with a thrust inverter in the open position equipped with the bent connecting rod illustrated in FIG. 3a, with the stresses exerted on the pivot point of the moveable panel of the secondary nozzle.
Figure 4:
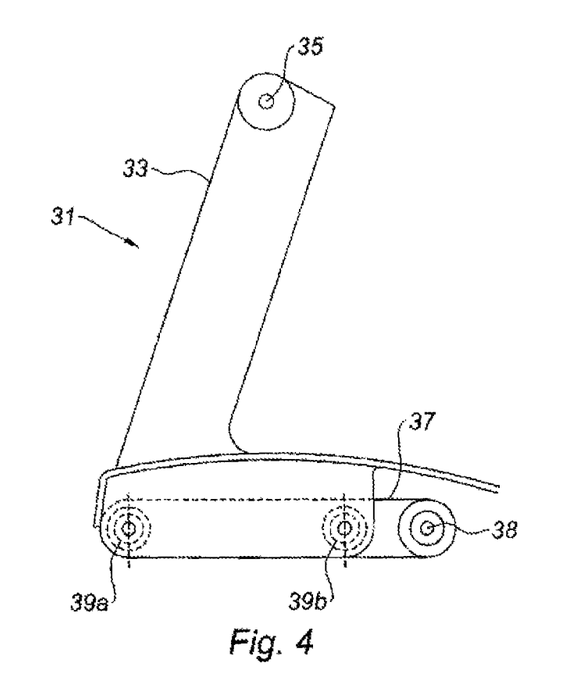
FIG. 4 illustrates a profile view of a bent connecting rod in two portions according to the invention equipped with ball jointed elements.

In order to manage the displacement of the cowl 2 and of the panel 3, while having an optimum position of the connecting rod relatively to the secondary flow, a bent connecting rod 19 is applied, the pivot point 21 of which on the fixed structure 9 is downstream from the body 23 of the connecting rod, when the moveable panel 3 is in the horizontal position. In order to stabilize the connecting rod, notably in the thrust inversion phase when the moveable panel 3 is inclined in a substantially transverse position relatively to the flow as illustrated in FIG. 3a, a sufficiently wide hub 25 fitted into the fixed structure 9 is used for stabilizing the connecting rod 19 during all the maneuvering phases. The pivot point 29 of the body 23 of the connecting rod is aligned with difficulty with the attachment point provided on the panel 3 (see FIG. 3b), because of the imposed constraints as regards manufacturing and positioning tolerance, in the case of a bent connecting rod 19 in a portion as illustrated in FIG. 3a.

The present invention provides a connecting rod in two portions connected together by suitably selected attachment means so as to give certain flexibility to the assembly, with which it is possible to facilitate alignment of the different pivot points of the connecting rod, in particular during all the phases for displacing moveable parts. Such a connecting rod is illustrated in FIGS. 4 to 7b.

A bent connecting rod in two portions 31 may ideally include a first connecting rod member or body 33, intended to be mounted to a moveable panel 3 of a secondary nozzle through the first pivot point or pivot point of the connecting rod body 35, into which is embedded a second connecting rod member or foot 37, intended to be mounted to the fixed structure 9 (see FIG. 4) through the second pivot point or connecting rod foot pivot point 38. Both members, 33, 37 are connected together by the self-aligning means 39a and 39b, so that the foot 37 and the body 33 are attached to each other while retaining a certain freedom of displacement relatively to each other. The self-aligning means 39a and 39b are positioned between the connecting rod foot pivot point 38 and the bend 40. The distance between the self-aligning means 39a and 39b is selected so as to be as large as possible in order to provide a maximum lever arm and reduce the torsion forces in the connecting rod in two portions 31.

Figure 5:
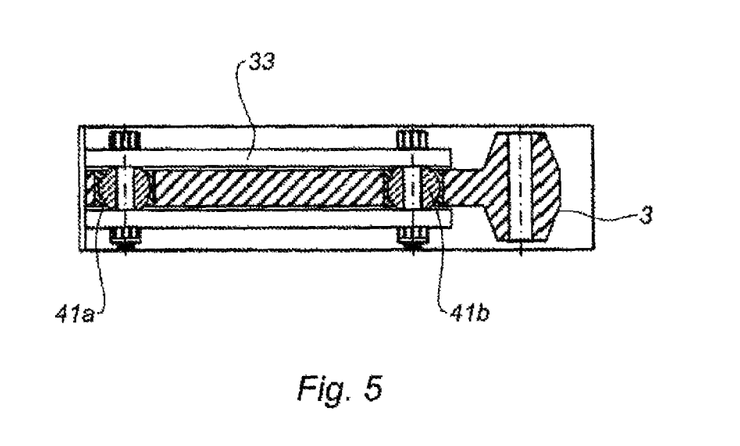
FIG. 5 illustrates a bottom view of the foot of the bent connecting rod of FIG. 4.

According to a particular embodiment, the self-aligning means 39a and 39b are ball-jointed elements 41a and 41b, as this is illustrated on the foot of the bent connecting rod 31 as seen from below in FIG. 5.

Figure 6A:
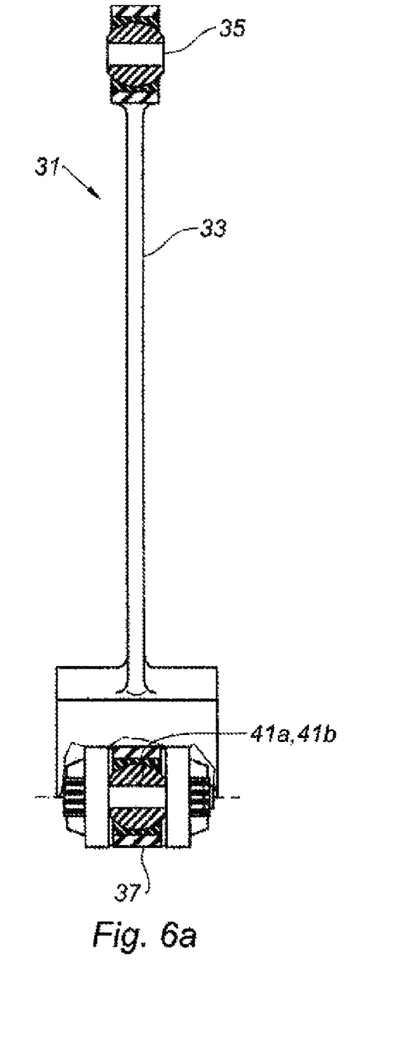
FIG. 6a illustrates a cross-sectional view of the foot of a connecting rod according to the invention on a section bearing a ball-jointed element.
Figure 6B:
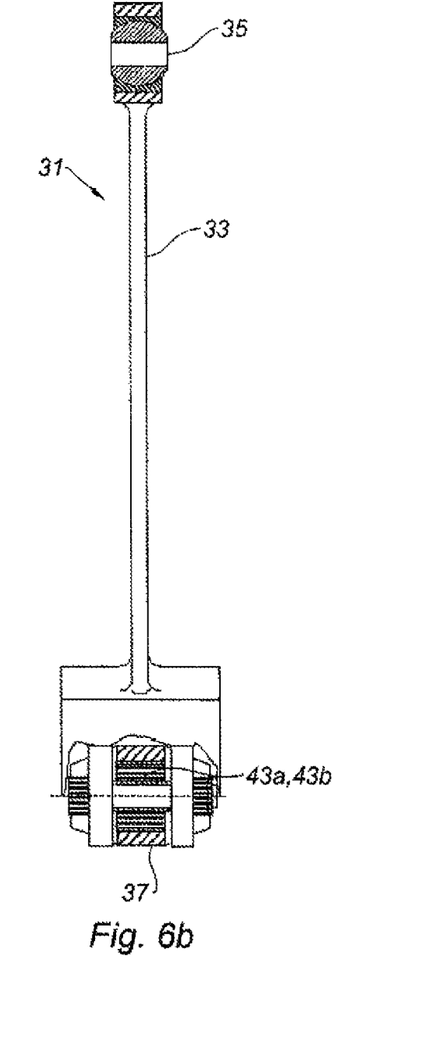
FIG. 6b illustrates a cross-sectional view of the foot of a connecting rod according to the invention on a section which bears an elastic ring of the Paulstra™ type.

The ball-jointed elements 41a and 41b of the embodiment illustrated in FIG. 6a, may be in certain cases advantageously replaced with elastic assemblies such as the rings of the Paulstra™ type 43a and 43b, as illustrated in FIG. 6b. Such rings 43a and 43b do not require any particular maintenance. Indeed, it is not necessary to lubricate them, considering that they essentially comprise a ferruling of different rubber layers and of metal elements.

Figures 7A, 7B:
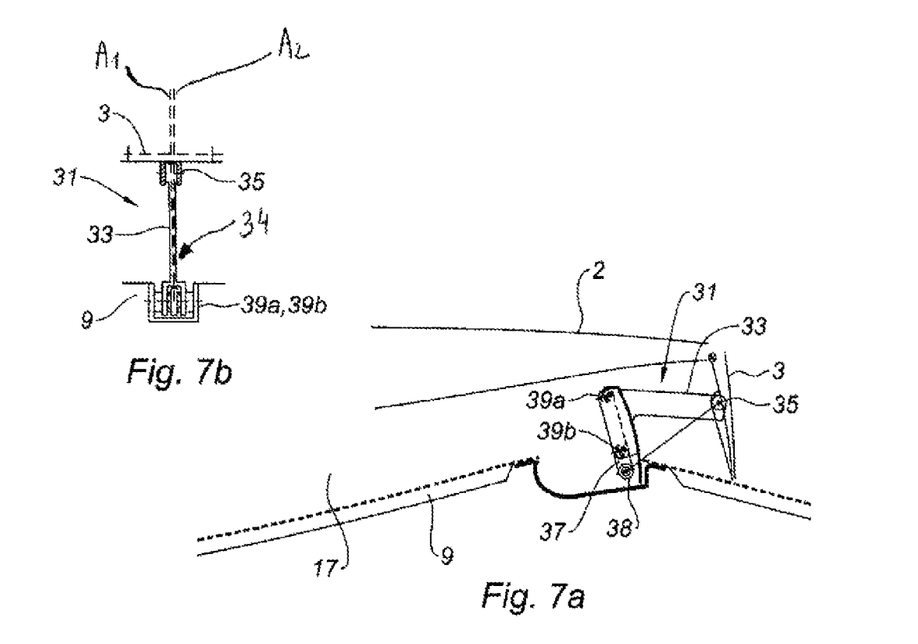
FIG. 7a illustrates a longitudinal sectional detailed view of the downstream section of an aircraft nacelle with a thrust inverter in the open position equipped with a bent connecting rod in two portions according to the invention.
FIG. 7b illustrates a cross-sectional schematic view of a downstream section portion of an aircraft nacelle with a thrust inverter in the open position equipped with the bent connecting rod illustrated in FIG. 7a, with the authorized angular deviations illustrated by arrows on the pivot point of the moveable panel of the nozzle.

FIG. 7b illustrates the authorized angular deviation on the connecting rod body pivot point 35 by means of this type of bent connecting rod in two portions 31 equipped with self-aligning means 39a and 39b, notably when the moveable panel 3 is completely inclined as illustrated in FIG. 7a. The axis A1 and A2 respectively correspond to the end positionings of the edge 34, illustrated on the right of FIG. 7b of the connecting rod body 33, allowed by the displacement exerted by the self-aligning means 39a and 39b.

Figure 8:
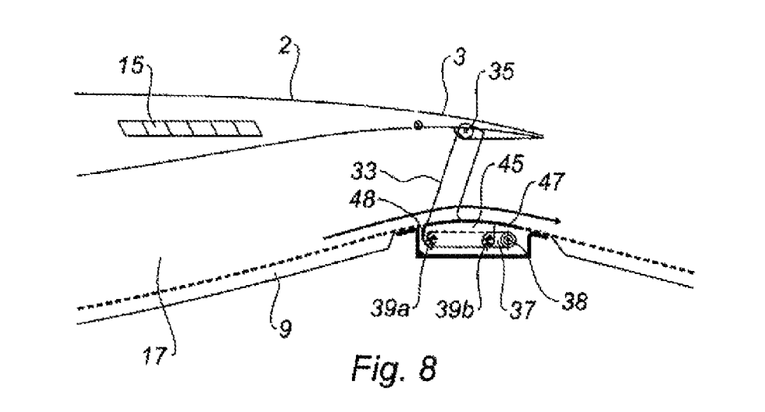
FIG. 8 illustrates a longitudinal sectional detailed view of the downstream section of an aircraft nacelle with a thrust inverter in the closed position equipped with a bent connecting rod fitted into the fixed structure, and bearing a portion of the fairing of the turbine engine extended with an apron.
Figure 9:
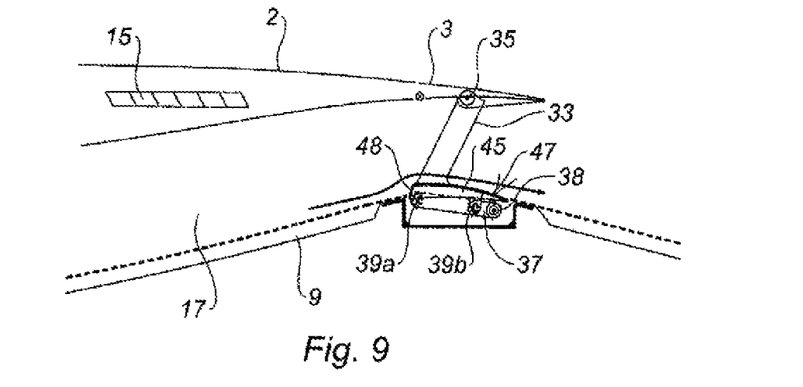
FIG. 9 illustrates the same view as FIG. 8, except that the thrust inverter is slightly open and the apron of the connecting rod foot is found in the secondary airflow.

Aerodynamic smoothing may be achieved in order to improve the fitting into the fixed structure 9 of the embedded portion of the connecting rod in two portions 31, for example, on a portion 45 of the body of the connecting rod 33, into which is embedded the connecting rod foot 37 (see FIG. 8). A shield 47 may be provided in continuity with the fairing of the fixed structure 9, and provided with an apron 48 in its most upstream portion of the secondary flow. Such an apron 48 provides a ramp to the flow which minimizes the aerodynamic perturbation during the swinging back of the connecting rod 31 towards the rear, as this is seen in FIG. 9.

Figure 10:
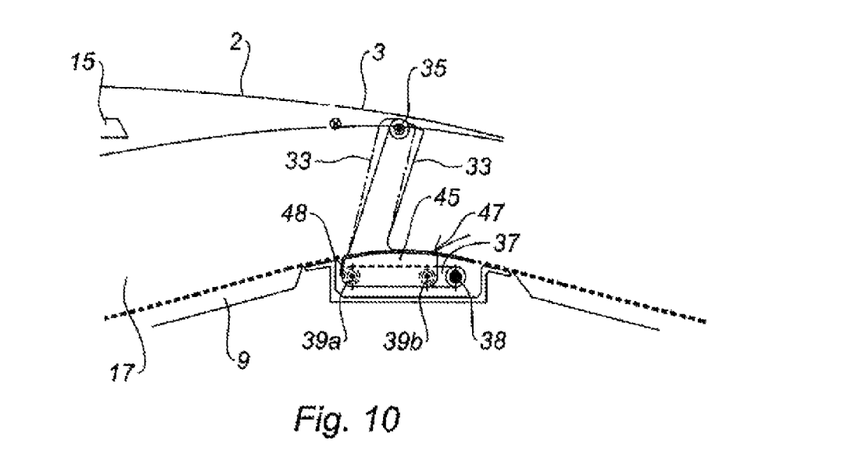
FIG. 10 illustrates a longitudinal sectional profile view of the downstream section of an aircraft nacelle with a bent connecting rod in two portions according to the invention, the upper portion of which is designed so as to be connected to the moveable panel through a pivot point; and wherein according to a first option, the axis of this pivot point is placed at two thirds of the width of the profile of the connecting rod (connecting rod body in solid lines), or else, according to another option, the axis is placed in the middle of the width of the profile of the connecting rod (connecting rod body in dotted lines).

In order to further improve the aerodynamic properties of the connecting rod in two portions 31 integrated in the annular passage 17, the body 33 of the connecting rod is profiled so that the axis of the connecting rod body pivot point 35 crosses the profile of the body of the connecting rod in its middle. FIG. 10 shows, in solid lines, a conventional arrangement with an axis which crosses the profile at one third of its width upstream, which is appropriate in the case of straight connecting rods in order to avoid alignment of the body of the connecting rod with the centre distance of the pivot points 35 and 38. In this same FIG. 10, the profile of a connecting rod 31 according to the invention is illustrated in dotted lines, with the axis in the middle of the profile. With this arrangement, it is possible without changing kinematics, to bring back a portion of the structure of the connecting rod body 33 into an area with a lower velocity of the secondary flow in order to reduce the impact on the aerodynamic performances.

Of course, the present invention is by no means limited to the described and illustrated embodiments, provided as simple examples; and notably concerning the morphology of the embedment of both portions of the bent connecting rod 31, of course it is possible to invert the structure of the interface with a self-aligning property of both members 33 and 37, by making the yoke on the connecting rod foot 37 and transporting the self-aligning means onto the connecting rod body 33.

The invention claimed is:

1. A bent connecting rod configured to connect a first assembly to a second assembly which are moveable relatively to each other and crossed by a flow in the space which they delimit, provided with at least one first and one second pivot points designed so as to allow pivoting of the connecting rod relatively to said first and second assemblies respectively, the bent connecting rod having a bend, wherein said bend is upstream from said flow relatively to said second pivot point, said second pivot point being adapted so as to be fitted into the second moveable assembly, wherein the bent connecting rod comprises at least two portions connected together through at least one self-aligning means wherein at least one of said portions is bent forming the bend which is unitary with the connecting rod, wherein the bent connecting rod further comprises a first and a second portion connected together through at least one self-aligning means, said first portion being adapted so as to be connected to the first assembly through the first pivot point and said second portion being adapted so as to be connected to the second assembly through the second pivot point, and wherein the second portion is embedded into the first portion and is maintained firmly attached to said first portion by two self-aligning means.

2. The bent connecting rod according to claim 1, wherein the portion adapted so as to be connected to the first assembly through the first pivot point is bent.

3. The bent connecting rod according to claim 1, wherein said self-aligning means are positioned between the second pivot point and the bend of the connecting rod.

4. The bent connecting rod according to claim 1, wherein said at least two portions are connected to each other by at least two self-aligning means spaced apart from each other.

5. The bent connecting rod according to claim 1, wherein the first pivot point crosses a profile of a body of the connecting rod substantially in a middle of a width of said profile.

6. The bent connecting rod according to claim 1, further comprising a shield which extends upstream from a body of the connecting rod through an apron.

7. The bent connecting rod according to claim 1, wherein the second pivot point comprises a hub.

8. The bent connecting rod according to claim 1, wherein at least one of said self-aligning means comprises one of a ball-jointed element and an elastic assembly.

9. A ducted-fan turbine engine nacelle comprising a downstream section, equipped with a thrust inversion device comprising a moveable cowl translationally mounted along a direction substantially parallel to a longitudinal axis of the nacelle capable of alternately passing from a closure position in which the moveable cowl ensures aerodynamic continuity of the nacelle and covers deflection means, to an open position in which the moveable cowl opens a passage in the nacelle and exposes the deflection means, said moveable cowl being also extended with at least one nozzle section mounted to a downstream end of said moveable cowl and comprising at least one panel rotatably mounted around at least one pivot along an axis substantially perpendicular to a longitudinal axis of the nacelle, wherein said panel is connected to a fixed structure of a fairing of the turbine engine through at least one bent connecting rod, rotatably mounted around the first and second pivot points on the panel of the nozzle section and on the fixed structure respectively, wherein the panel and the fixed structure are configured to move relatively each other and delimit a space for a flow crossed by the bent connecting rod having a bend, wherein said bend is upstream from said flow relatively to said second pivot point, said second pivot point being adapted so as to be fitted into the second moveable assembly, and wherein the bent connecting rod further comprises at least two portions connected together through at least one self-aligning means, and at least one of said portions is bent forming the bend which is unitary with the connecting rod.

* * * * *